United States Patent [19]
Page

[11] Patent Number: 5,348,810
[45] Date of Patent: Sep. 20, 1994

[54] ELASTOMERIC LAMINATED SHEET METAL PARTS

[75] Inventor: Michael C. Page, Richmond, Mich.

[73] Assignee: LTC Roll & Engineering, Mt. Clemens, Mich.

[21] Appl. No.: 751,559

[22] Filed: Aug. 29, 1991

[51] Int. Cl.$^5$ .................. B32B 15/06; B32B 15/18
[52] U.S. Cl. .................. 428/625; 428/685; 428/667
[58] Field of Search .............. 428/625, 685, 36.8, 428/457, 595, 677, 624, 626, 124, 3, 463; 220/670, 671, 672, 673, 678, 680; 24/294; 49/492.1; 293/126

[56] References Cited

U.S. PATENT DOCUMENTS

| | | | |
|---|---|---|---|
| 2,657,099 | 10/1953 | Judd | 428/31 |
| 3,136,676 | 6/1964 | Fisch | 156/244 |
| 3,436,447 | 4/1959 | Meitinger | 264/135 |
| 3,487,504 | 1/1970 | Shanok et al. | 425/113 |
| 4,081,504 | 3/1978 | Wenrick et al. | 264/174 |
| 4,220,681 | 9/1980 | Narita | 428/31 |
| 4,291,076 | 9/1981 | Katoh | 293/126 |
| 4,293,140 | 10/1981 | Bell et al. | 428/31 |
| 4,381,273 | 4/1983 | Azzola | 264/45.9 |
| 4,578,858 | 4/1986 | Adell | 29/527.4 |
| 4,697,327 | 10/1987 | Adell | 29/527.4 |
| 4,859,391 | 8/1989 | Jackson | 264/162 |
| 4,898,640 | 2/1990 | O'Connor | 156/204 |

FOREIGN PATENT DOCUMENTS 0111155 4/1989 Japan ..................... 428/31

Primary Examiner—Benjamin R. Fuller
Assistant Examiner—Valerie Ann Lund
Attorney, Agent, or Firm—Howard & Howard

[57] ABSTRACT

Raw sheet metal substrate (36) passing through an extrusion die (54) is partially laminated with a thin film of plastic (40). A boundary line (42) is formed between the laminated and unlaminated portions of the substrate (36). The sheet metal substrate (36) is folded upon itself so that the plastic laminate (40) bears in pressing relation against the unlaminated portion of the substrate (36) to create a fold (44) sealed against lateral moisture penetration. The unlaminated portion of the substrate (36) may be chrome plated (50). The extrusion die (54) includes an adjustable die member (64) and an adjustable wear plate (78). Alternatively, the extrusion die (54) may include an adjustable extrusion orifice (62) for varying the thickness of the plastic extruded onto the sheet metal substrate (36). Two sheet metal substrates (36') are moved through the extrusion die (54') simultaneously and in back-to-back relation to neutralize reaction forces from the respective emissions of pressurized plastic.

4 Claims, 6 Drawing Sheets

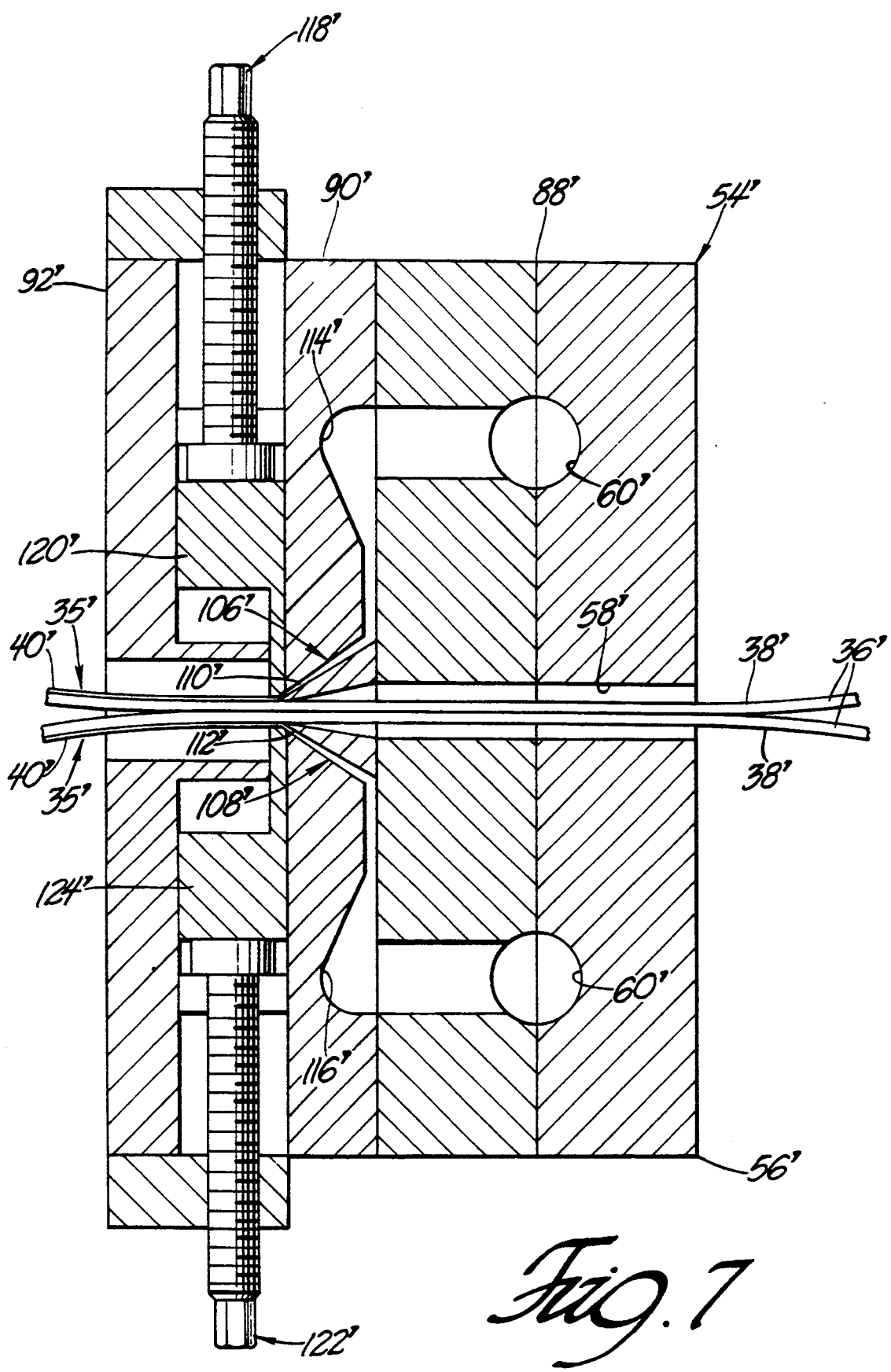

ELASTOMERIC LAMINATED SHEET METAL PARTS

TECHNICAL FIELD

The subject invention relates to a method and apparatus for forming plastic laminated sheet metal parts, and more particularly to an improved laminated sheet metal substrate having a fold therein sealed against lateral moisture penetration, and an improved extrusion die for laminating the plastic film onto the substrate.

BACKGROUND OF THE INVENTION

Metallic sheet metal parts are frequently coated with a layer of plastic for protection, appearance, and as an alternative to painting. For sheet metal parts having a consistent cross-sectional shape along the length, such as extruded or roll-formed parts, the plastic is typically extruded over a sheet metal substrate. In the extrusion process, the preformed sheet metal substrate is pushed or pulled through an extrusion die simultaneously with a molten thermoplastic material so that a laminated composite strip is produced.

Generally, the laminating of a plastic material onto the sheet metal substrate in an extrusion process has been carried out only after the sheet metal substrate has been formed to its final shape. According to this prior art technique, it is difficult to control the dimensional tolerances of the final laminated product because the sheet metal substrate is preformed to a contoured shape. Also, re-tooling is expensive because for each different cross-sectional shape, a separate extrusion die must be manufactured, at appreciable cost.

The prior art has partially solved this problem by laminating the substrate with plastic prior to contouring the substrate. That is, the plastic is laminated to the substrate while still in the flat, unformed, or raw, condition. One example of this prior art technique is shown in U.S. Pat. No. 4,578,858 to Adell, issued Apr. 1, 1986. The primary advantage derived from extruding the laminate onto flat substrate is that the extrusion die may remain unchanged while the final shape contour of the finished product varies.

However, even the prior art extrusion dies for extruding onto flat unformed substrates are cumbersome to use and cannot be precisely controlled to vary the thickness of the extruded plastic lamination layer. Further, the lamination process is slow because only one sheet metal substrate is moved through the extrusion die at a time.

SUMMARY OF THE INVENTION AND ADVANTAGES

The subject invention contemplates a method of forming a composite contoured strip comprising the steps of moving an elongated sheet metal substrate into an extrusion die, laminating a portion of the sheet metal substrate with a plastic film as the substrate moves through the die while leaving another portion of the substrate unlaminated to form a substantially linear boundary line between the laminated and unlaminated portions of the substrate, and is characterized by forming a fold in the substrate substantially parallel to and adjacent the boundary line so that the laminated portion bears in pressing relation against the unlaminated portion of the substrate to create a contoured composite strip having a fold therein sealed against lateral moisture penetration by the plastic film.

The subject invention also contemplates a composite contoured strip comprising a sheet-like malleable substrate having an upper surface, a sheet-like layer of elastomeric material laminated to a portion of the upper surface with a generally linear boundary line along the upper surface dividing the elastomeric layer from an unlaminated portion of the upper surface, and characterized by a fold in the substrate extending adjacent and parallel to the boundary line pressing the elastomeric layer into compression against the unlaminated portion of the upper surface to seal the fold against lateral moisture penetration.

The subject invention further contemplates an extrusion die assembly for laminating a thin film of elastomeric material onto a continuous strip metallic substrate. The assembly comprises a housing having a longitudinally extending passageway disposed therethrough for guiding a continuous strip metallic substrate, a distribution channel disposed within the housing for conveying fluidic elastomeric material, an extrusion orifice communicating with the distribution channel for extruding fluidic elastomeric material onto the substrate within the passageway, a die member disposed in the passageway immediately downstream of the extrusion orifice, and characterized by a die adjuster means for adjusting the position of the die member laterally of the passageway to vary the thickness of the elastomeric lamination extruded onto the continuous strip metallic substrate.

Further, the subject invention contemplates an extrusion die assembly for laminating a thin film of elastomeric material onto a continuous strip metallic substrate. The assembly comprises a diverter block having a distribution channel disposed therein for conveying fluidic elastomeric material, a longitudinally extending passageway disposed through said diverter block for guiding a continuous strip metallic substrate, a flow plate secured to the diverter block with the passageway extending therethrough and including an extrusion orifice communicating with the distribution channel for extruding fluidic elastomeric material onto the substrate within the passageway, the extrusion orifice having a lower edge disposed adjacent to the passageway and an upper edge spaced laterally from the lower edge, a die member disposed in the passageway immediately downstream of the extrusion orifice, and characterized by an orifice adjuster means for laterally adjusting the upper edge of the extrusion orifice relative to the lower edge to vary the thickness of the elastomeric lamination extruded onto the continuous strip metallic substrate.

The subject invention also contemplates a multiple extrusion die assembly for simultaneously laminating a thin film of elastomeric material onto two separate continuous strip metallic substrates. The assembly comprises a housing having a longitudinally extending passageway disposed therethrough for guiding two moving continuous strip metallic substrates in back-to-back relation, a distribution means disposed within the housing for conveying fluidic elastomeric material under pressure, a first extrusion means disposed in the passageway communicating with the distribution means for extruding pressurized fluidic elastomeric material onto the metallic substrate within the passageway, and characterized by a second extrusion means communicating with the distribution means and disposed in the passageway directly laterally across from the first extrusion means for emitting pressurized fluidic elastomeric material onto the second metallic substrate within the passageway such that the pressurized elastomeric materials from the first extrusion means and the second extrusion means are directed toward each other to neutralize the reaction forces from the respective emissions of pressurized elastomeric material.

And finally, the subject invention contemplates a method of forming a composite contoured strip comprising the steps of moving a flat first sheet metal substrate having an upper surface into an extrusion die, laminating a portion of the first substrate upper surface with a plastic film as the first substrate moves through the extrusion die, moving a flat second sheet metal substrate having a lower surface into the extrusion die in back-to-back relation with the first substrate, and characterized by laminating a portion of the second substrate lower surface with a plastic film as the second substrate moves through the extrusion die to neutralize the reaction forces from the respective emissions of pressurized elastomeric materials.

The subject invention provides improved method and apparatus for extruding plastic onto a sheet metal substrate. The unique die adjuster means and orifice adjuster means provides control for the thickness of the elastomeric layer extrusion. Also, the novel multiple extrusion die assembly provides for simultaneous laminating of elastomeric material onto two back-to-back strips, which not only doubles productivity, but also eliminates the reaction forces within the die assembly normally resulting from the highly pressurized elastomeric material. Because the subject invention extrudes the plastic elastomeric layer while the sheet metal remains in a flat or uncontoured condition, the composite strip can be subsequently folded so that the laminated portion bears in pressing relation against the unlaminated portion of the substrate, thereby sealing the fold against lateral moisture penetration. Additionally, the unique fold is particularly useful when the unlaminated portion of the substrate is subsequently chrome plated in that a highly receptive plating surface is created by the fold.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is a s cross-sectional view of a multiple extrusion die assembly according to the subject invention.

DETAILED DESCRIPTION OF THE PREFERRED EMBODIMENTS

Figure 1:
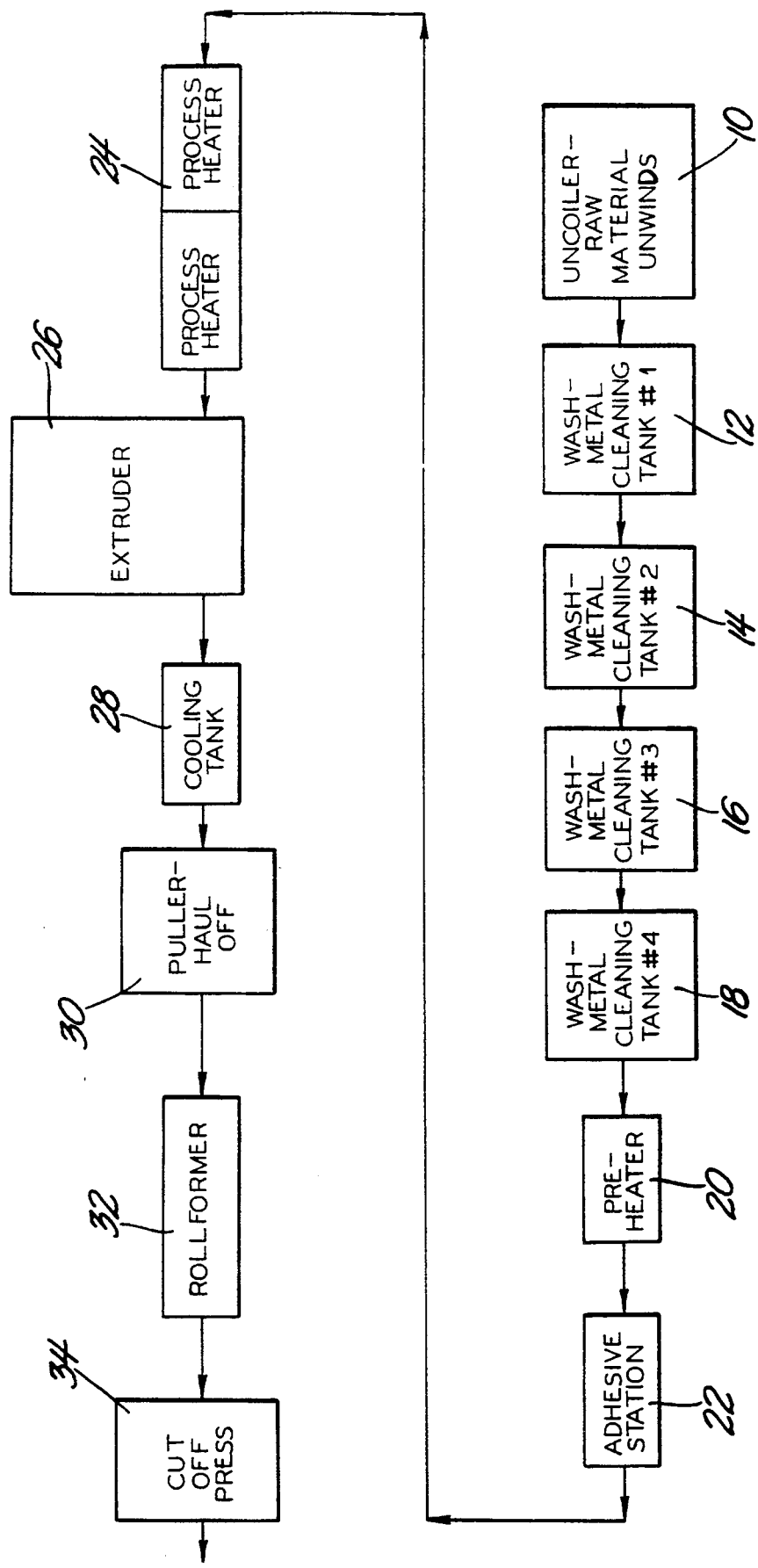
FIG. 1 is a diagrammatic view illustrating a process for forming a contoured composite strip according to the subject invention.

Referring to the Figures, wherein like numerals indicate like or corresponding parts throughout the several views, a diagrammatic view of an assembly line for manufacturing composite contoured strips is illustrated. An uncoiler 10 comprises a large roll of sheet metal substrate. In this raw form, the uncoiler 10 is positioned to continuously unwind the sheet metal substrate in unbroken fashion directly into a series of four metal cleaning tanks 12, 14, 16, and 18 provided for washing the upper and lower surfaces of the sheet metal substrate. The sheet metal at a high temperature to remove all surface dirt and grease from the raw sheet metal substrate. This solvent cleaning of the substrate is an essential step in obtaining proper surface energy so the subsequently applied adhesive will bond to the substrate. Some form of high pressure air dispensing nozzle (not shown) is disposed to remove moisture from the substrate exiting the fourth metal cleaning tank 18.

From the cleaning tanks, the sheet metal substrate is moved to a preheater 20 which dries any excess moisture from the substrate that had not been blown off by the air dispensing nozzle as the substrate exited the fourth metal cleaning tank 18.

The preheated substrate strip next passes through an adhesive station 22 where a thin layer of liquified adhesive is applied to the sheet metal substrate in order to enhance the bond between the thermoplastic polymer layer and the sheet metal substrate. The adhesive is applied by a stationary felt-like applicator continuously wetted with the adhesive agent and held in continuous contact with an upper surface of the traveling sheet metal substrate. Satisfactory results have been obtained using B. F. Goodrich adhesive number A1630B.

Next, the sheet metal substrate is directed to a pair of process heaters 24 which function to heat the freshly applied adhesive for the purpose of cross-linking the molecular chains thereof. The process heaters 24 effectively set the adhesive and permanently bond the adhesive to the upper surface of the sheet metal substrate.

The traveling sheet metal substrate is then directed to an extruder 26 which pumps the thermoplastic material into an extrusion die. The extruder 26 is of the usual type including a hopper for delivering raw thermoplastic material to a heated screw mechanism. The screw mechanism transfers the plastic to the extrusion die under pressure and in a molten condition for extrusion onto the substrate. Hence, the sheet metal substrate is directed through the extrusion die and coated, or laminated, with a thin layer thermoplastic material. Because the thermoplastic material is extruded at an elevated temperature, the now composite strip exiting the extruder 26 must be cooled in a cooling tank 28. Cool recirculated water is washed over the freshly extruded composite strip in the cooling tank 28 to rigidify the extruded thermoplastic material.

The composite strip is then fed to a puller-haul off 30 which functions to pull the composite strip from the uncoiler 10. The puller-haul off 30 has an adjustable speed so that the linear traveling rate of the sheet metal substrate may be adjusted. The tension in the sheet metal substrate is controlled by providing a brake (not shown) on the uncoiler 10 which is also adjustable.

From the puller-haul off 30, the composite strip is directed into a roll former 32 which includes a series of upper and lower rollers for gradually forming the composite strip into its final cross-sectional shape. Once the composite strip has been completely formed to a final cross-sectional shape, it is moved directly to a cut off press 34 where the composite strip is cut to the desired length while in motion. From there, the cut pieces of composite strip are further shaped as needed, possibly treated such as by chrome plating, and packaged for shipment.

Figure 2:
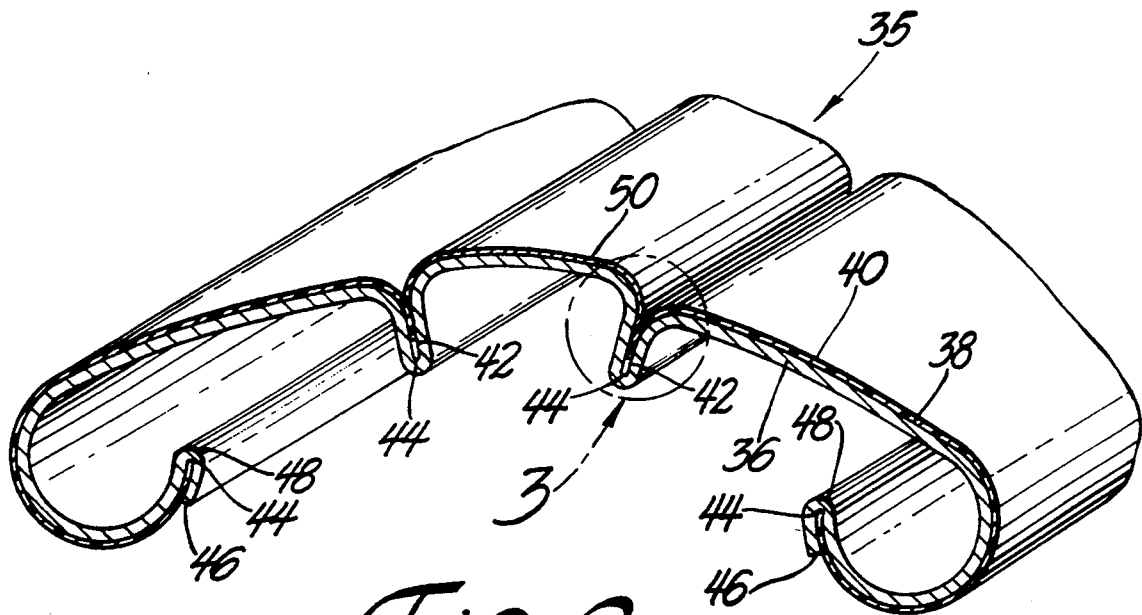
FIG. 2 is a fragmentary perspective view of a unique composite contoured strip according to the subject invention.
Figure 3:
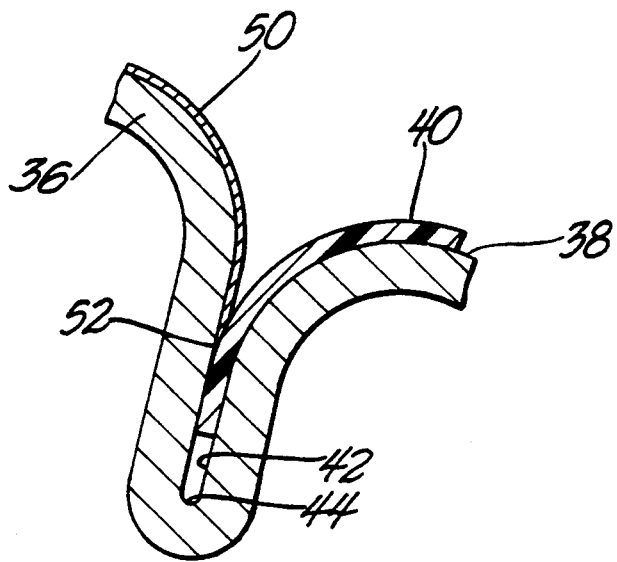
FIG. 3 is an enlarged fragmentary view of the enclosed area indicated at 3 in FIG. 2.

FIGS. 2 and 3 illustrate a roll-formed composite strip, generally shown at 35, formed according to the method and apparatus of the subject invention. More particularly, the composite strip 35 includes a sheet-like malleable substrate 36 having an upper surface 38. A sheet-like layer of elastomeric thermoplastic material 40 is laminated to a portion of the upper surface 38 by the extruder 26. Although the extruding of the elastomeric layer 40 onto the substrate 36 is in accordance with the preferred embodiment of the subject invention, it is to be understood that the elastomeric layer 40 may be applied to the upper surface 38 of the substrate 36 by non-extruding techniques. For example, the elastomeric layer 40 may be applied in sheet form by a simple veneering technique, or any other manner in which a sheet-like layer of elastomeric material 40 remains bonded to the upper surface 38 of the substrate 36. A generally linear boundary line 42 is formed along the upper surface 38 dividing the elastomeric layer 40 from the unlaminated portion of the upper surface 38. Hence, the boundary line 42 comprises the interface, or line of demarcation, between the laminated and unlaminated portions on the upper surface 38 of the substrate 36. Frequently, as with the embodiment shown in FIG. 2, multiple discrete elastomeric layers 40 will be applied in parallel stripe fashion onto the upper surface 38 of the substrate 36. This is referred to as "striping" by those skilled in the art because both the underlying adhesive and the elastomeric layer 40 are applied in a manner similar to painting stripes.

The subject composite strip 35 is unique in that a fold 44 is formed in the substrate 36 during the roll forming operation of the roll former 32. Therefore, the fold 44 extends the length of the strip 35. The fold 44 is positioned adjacent and parallel to the boundary line 42 such that the elastomeric layer 40 is compressed against the unlaminated portion of the upper surface 38 in order to seal the fold 44 against lateral moisture penetration. That is, the portion of the elastomeric layer 40 adjacent the boundary line 42 functions as a compression seal to perfect and maintain a water resistant joint above the fold 44. Preferably, the elastomeric layer 40 is comprised of a polyvinylchloride (PVC) material which is particularly well suited to close the fold 44 against lateral moisture penetration.

The subject fold 44 finds usefulness in two important respects. First, the portion of the unlaminated upper surface 38 may be disposed along a peripheral edge 46 of the substrate 36. As such, when the fold 44 is formed in the substrate 36, a nice, smoothly rounded hem-like end 48 of the strip 35 is formed by the fold 44. By trapping the elastomeric layer 40 within the fold 44, the decorative strip 35 is made resistant to corrosion by the trapping, or collecting, of moisture. The second unique aspect of the subject fold 44 comprises the formation of a receptive surface to which a layer of metallic plate, e.g., chrome plate 50, may be applied. Preferably, the substrate 36 comprises a stainless steel material which provides corrosion resistance and a suitable base over which the chrome plate layer 50 may be applied. As shown in FIG. 2, two spaced sections of elastomeric layer 40 may be positioned on the upper surface 38 of the substrate 36, leaving an unlaminated central portion. A pair of folds 44 capture the two inwardly formed boundary lines 42 thus establishing an improved bonding surface for the chrome plate layer 50.

The improved bonding surface is necessary because during the extrusion process, the boundary line 42 is always formed having slight irregularities or imperfections which are unavoidable and would cause difficulties if the chrome plate layer 50 were permitted to overlap the boundary line 42. More particularly, the adhesive layer must be fully disposed below the elastomeric layer 40 or else separation of the elastomeric layer 40 from the substrate 36 will occur, thus creating a pocket, or crevice, which traps moisture therein causing corrosion. Therefore, in order to prevent this from occurring, the adhesive layer is striped onto the upper surface 38 slightly beyond the boundary line 42. Unfortunately, the chrome plate layer 50 will not adhere in the least to the adhesive layer. Hence, whenever the chrome plate layer 50 is applied right up to the boundary line 42, the chrome plate layer 50 overlapping the extended portion of the adhesive layer will begin to separate from the upper surface 38 of the substrate 36. As such flaking away of the chrome plate layer 50 is highly undesirable, the subject fold 44 overcomes this deficiency by isolating the boundary line 42 and the attendant extended portion of adhesive layer from the chrome plate layer 50, while preserving the visual quality of chrome plate 50 contiguous the elastomeric layer 40. This improved junction between the chrome plate 50 and the elastomeric layer 40 is shown in detail in FIG. 3 where the terminal end 52 of the chrome plate layer 50 is actually held in place against the substrate 36 in a wedge-like manner by the elastomeric layer 40. The fold 44 provides the necessary contours to draw the terminal end 52 of the chrome plate 50 toward the fold 44 by capillary action and thus prevent the terminal end 52 from lifting or flaking away.

The method of forming the above described composite contoured strip 35 comprises the steps of moving an elongated sheet metal substrate 36 into an extrusion die of the extruder 26 and laminating a portion of the sheet metal substrate 36 with a plastic film elastomeric layer 40 as the substrate 36 moves through the extrusion die while leaving another portion of the substrate 36 unlaminated to form a substantially linear boundary line 42 between the laminated 40 and unlaminated portions of the substrate 36. The substrate 36 is maintained flat and in a generally planer, i.e., raw, state during lamination. Next, a roll forming operation forms a fold 44 in the substrate 36 substantially parallel to and adjacent the boundary line 42 so that the laminated portion 40 bears in pressing relation against the unlaminated portion of the substrate 36 to create a contoured composite strip 35 having a fold 44 therein sealed against lateral moisture penetration by the plastic film 40.

Preferably, the fold 44 is formed in the unlaminated portion of the substrate 36. That is, the crease in the substrate 36 created by the fold 44 occurs wholly in the unlaminated portion of the substrate 36, at a position spaced slightly laterally from the boundary line 42. Subsequently, the unlaminated portion of the substrate 36 may be plated with chrome 50 to present an aesthetically pleasing and durable product. As an alternative or in addition to chrome plating, the fold 44 may by positioned along the peripheral edge 46 of the substrate 36 to create a rounded end 48 of the substrate 36, described above.

Figure 4:
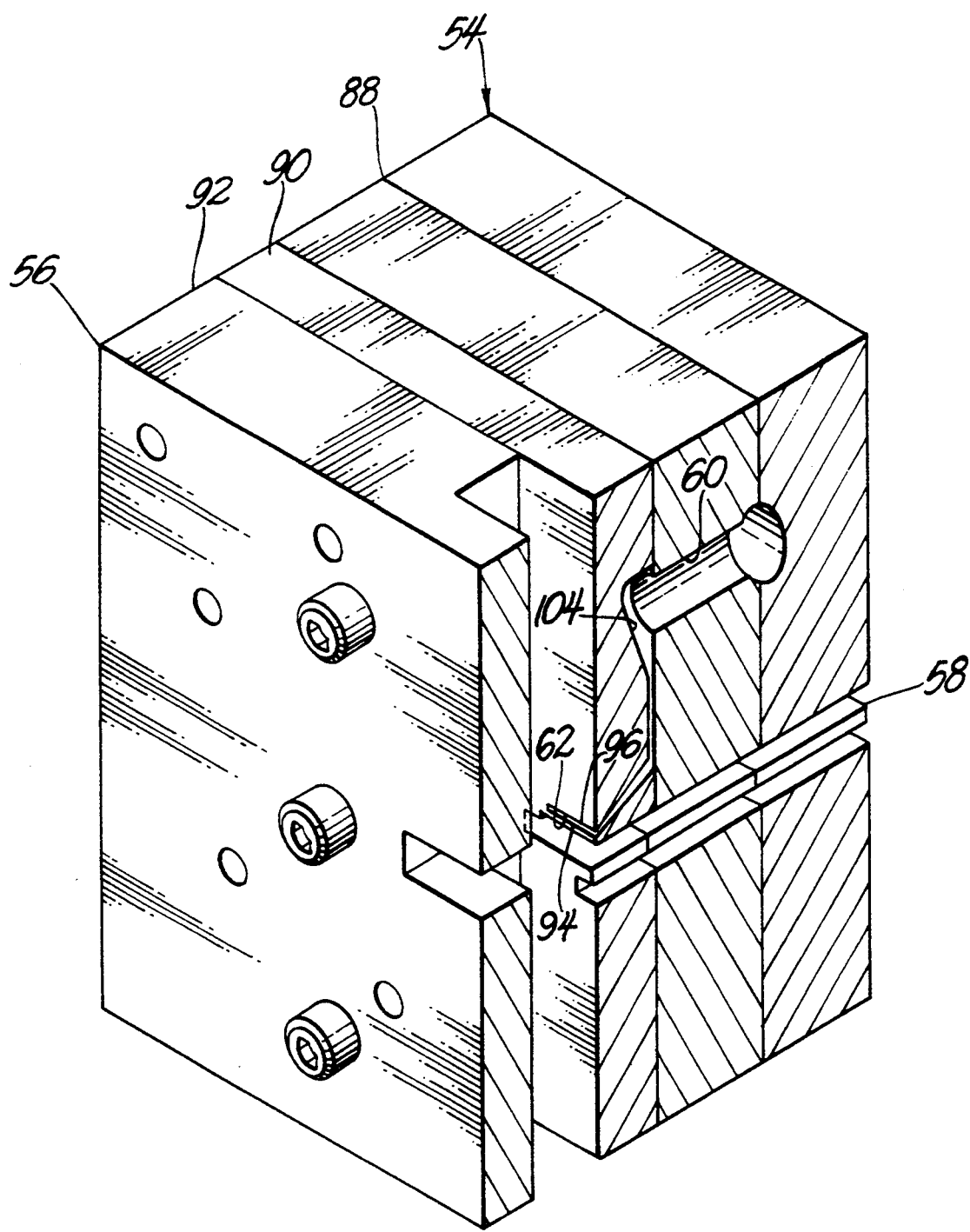
FIG. 4 is a cross-sectional view of an extrusion die assembly according to the subject invention showing certain structural features removed for clarity.
Figure 5:
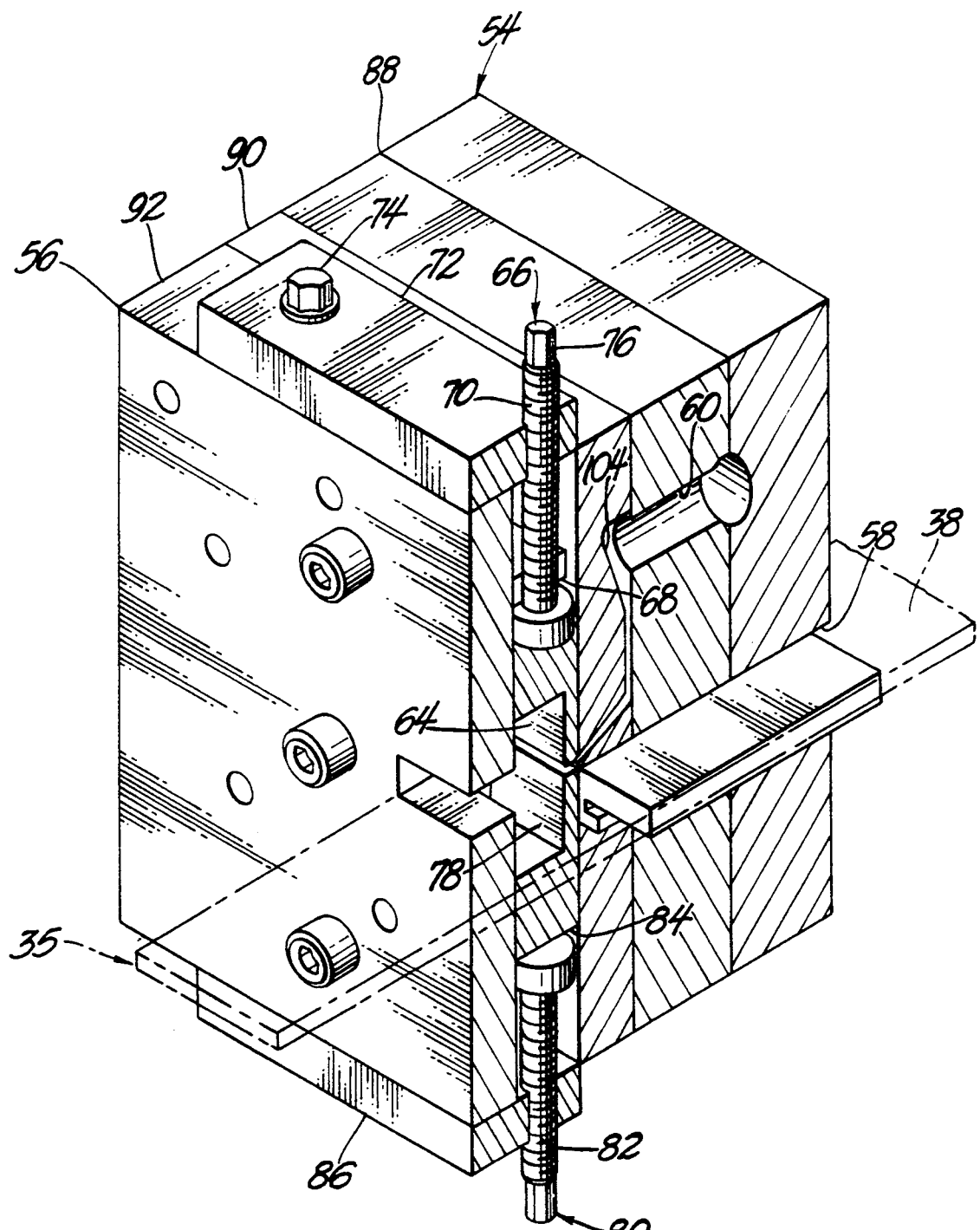
FIG. 5 is a cross-sectional view of an extrusion die assembly as in FIG. 4 showing the die adjuster means of the subject invention.

Referring now to FIGS. 4 and 5, the extruder 26 is shown to include an extrusion die, generally indicated at 54, for laminating the thin film of elastomeric material 40 onto the continuous strip metallic substrate 36. The extrusion die 54 includes a housing 56 having a longitudinally extending passageway 58 disposed therethrough for guiding the continuous strip metallic substrate 36. A distribution channel 60 is disposed within the housing 56 for conveying fluidic elastomeric material. An extrusion orifice 62 communicates with the distribution channel 60 for extruding fluidic elastomeric material onto the substrate 36 within the passageway 58. A die member 64 is disposed in the passageway 58 immediately downstream of the extrusion orifice 62 and acts in cooperation with the extrusion orifice 64 to define the precise thickness of the elastomeric layer 40 applied to the substrate 36.

Preferably, the extrusion die 54 includes a plurality of extrusion orifices 62 and corresponding die members 64 for applying multiple discrete elastomeric layers 40 in parallel strip fashion, as required by the strip 35 shown in FIG. 2. The plurality of extrusion orifices 62 all communicate with the same distribution channel 60 so as to apply the same elastomeric material. However, it is frequently desirable to extrude multiple discrete elastomeric layers 40 of dissimilar or different colored materials (not necessarily elastomeric materials). When this is the case, multiple extrusion dies 54, arranged in line, i.e., with one located downstream of another, can be utilized for the independent extrusion of dissimilar materials. Hence, if it is desired that the composite strip 35 shown in FIG. 2 be formed with one of the elastomeric layers 40 formed of green PVC and the other elastomer layer 40 formed of red PVC, the substrate 36 will have passed through two consecutive extrusion dies 54, with one of the extrusion dies 54 extruding a green PVC stripe and the other extrusion die 54 extruding a red PVC stripe. Alternatively, the multiple in-line extrusion die 54 concept may be employed to apply a second or third layer of material, e.g., a clear coat over a previously extruded elastomeric layer. Such is particularly useful whenever the first applied elastomeric layer 40 is imparted with a textured surface.

The subject extrusion die 54 is characterized by including a die adjuster means, generally indicated at 66 FIG. 5, for adjusting the position of the die member 64 laterally of the passageway 58 to vary the thickness of the elastomeric layer 40 extruded onto the continuous strip metallic substrate 36. More particularly, the die member 64 is formed including a socket 68 for rotatably receiving a screw 70 of the die adjuster means 66. The screw 70 is threadably received in a nut 72 which, in turn, is fixedly secured to the housing 56 by bolts 74. The screw 70 is provided with a tool engaging portion 76 at the top end thereof for receiving a rotary tool to impart rotary motion to the screw 70.

In a similar manner, an anti-wear plate 78 is provided and disposed in the passageway 58 laterally opposed to the die member 64. An anti-wear adjuster means, generally indicated at 80 in FIG. 5, is provided for adjusting the position of the anti-wear plate 78 laterally of the passageway 58. The anti-wear adjuster means 80 includes an anti-wear screw 82 rotatably received in a socket 84 of the anti-wear plate 78 and in the usual manner is threadably received in a nut 86 fixedly secured to the housing 56.

Because, as stated above, it is preferential that multiple extrusion orifices 62 communicate with the distribution channel 60 for applying multiple stripes of elastomeric material 40, it necessarily follows that a corresponding multiple number of die adjuster means 66 and anti-wear adjuster means 80 be provided. In this manner, the multiple discrete stripes of elastomeric layers 40 may be extended onto the substrate 36 in differing thicknesses.

The housing 56 is comprised of three elements. First, a diverter block 88 is formed by of two plate-like members held in abutting engagement and having mating milled surfaces forming the distribution channel 60 therebetween for conveying fluidic elastomeric material. The distribution channel receives molten pressurized thermoplastic material directly from the transfer screw mechanism of the extruder 26. The substrate passageway 58 extends completely through the diverter block 88 for guiding the continuous strip metallic substrate 36. Second, a flow plate 90 is secured to the diverter block 88 with the passageway 58 also extending in a linear fashion through the flow plate 90. The flow plate 90 includes a milled surface which aligns with the distribution channel 60 in the diverter block 88 and terminates in the extrusion orifice 62. The cavity thus formed in the flow plate 90 communicates with the distribution channel 60 for extruding fluidic elastomeric material onto the substrate 36 within the passageway 58. The extrusion orifice 62 has a lower edge 94 disposed adjacent to the passageway 58 and an upper edge 96 spaced laterally from the lower edge 94. The third element of the housing 56 comprises a die plate 92 for slideably supporting the die member 64 and the anti-wear plate 78. The three elements 88,90,92 are fastened together by bolts, with heater cartridges (not shown) being strategically embedded to heat the entire housing 56 during the extrusion operation to maintain the flowability of the elastomeric material 40.

Figure 6:
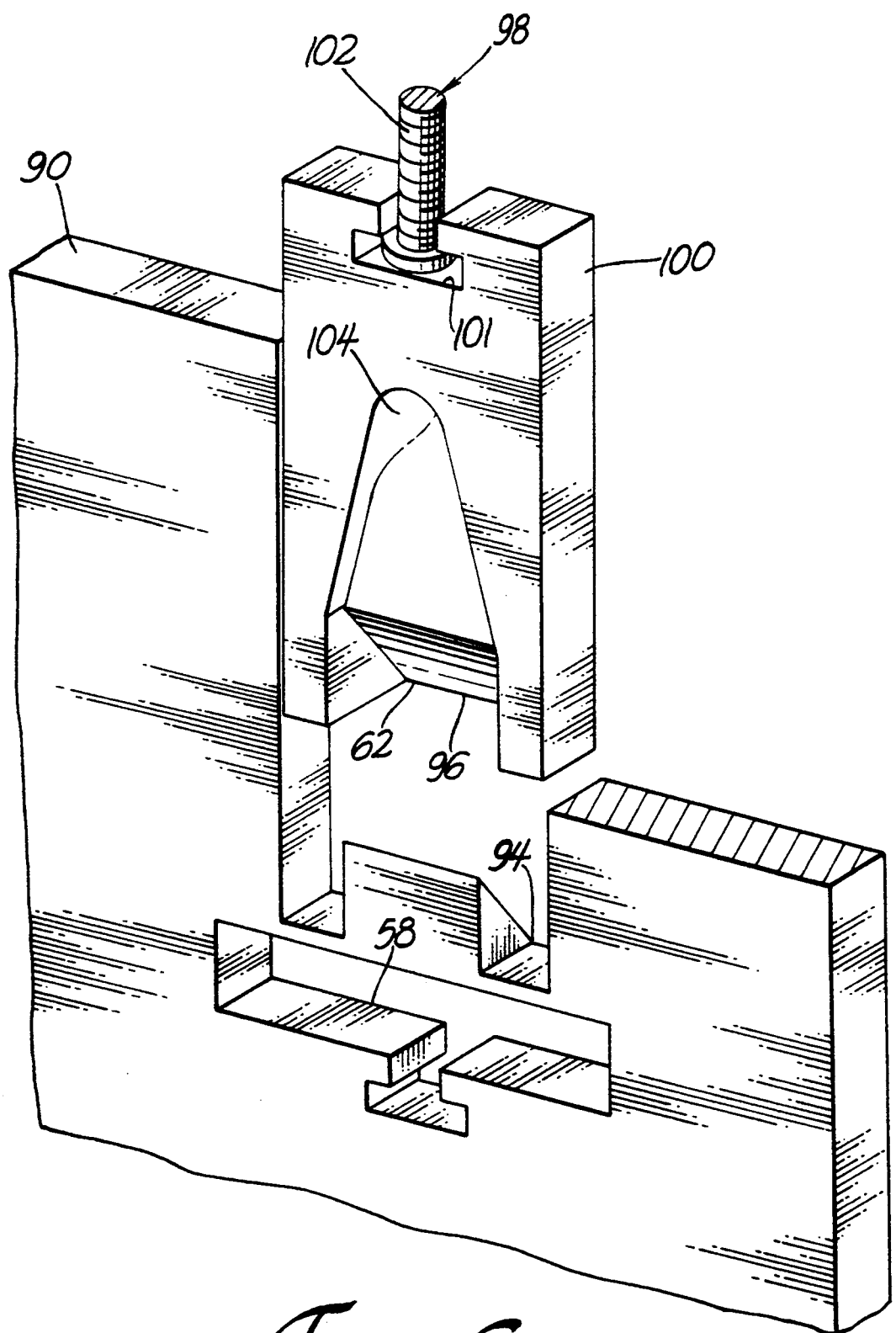
FIG. 6 is a perspective view of the orifice adjuster means according to the subject invention.

In the alternative embodiment shown in FIG. 6, an orifice adjuster means, generally indicated at 98, is provided for laterally adjusting the upper edge 96 of the extrusion orifice 62 relative to the lower edge 94 to vary the thickness of the elastomeric lamination 40 extruded onto the continuous strip metallic substrate 36. More particularly, the flow plate 90 includes an adjustable slide member 100 supported for vertical sliding movement within the flow plate 90. The slide member 100 includes a socket 101 for rotatably receiving an orifice screw 102 of the orifice adjuster means 98. Similar to the die adjuster means 66 and the anti-wear adjuster means 80, the orifice screw 102 is rotatably received in a nut (not shown) secured relative to the housing 56. Hence, upon rotation of the orifice screw 102, the slide member 100 is displaced vertically to adjust the distance between the lower 94 and upper 96 edges of the extrusion orifice 62, and hence adjust the thickness of elastomeric lamination 40 extruded onto the substrate 36.

The slide member 100 includes a hollow 104 formed by milling and defining a cavity bounded by the forward surface of the diverter block 88. As mentioned above, the hollow 104 forms a portion of the distribution channel 60 for conveying fluidic elastomeric material to the extrusion orifice 62. As such, the upper edge 96 of the extrusion orifice 92 is formed on and moveable with the slide member 100.

Not only does the slide member 100 of the orifice adjuster means 98 provide added control over the thickness of elastomeric material extruded onto the substrate, but also allows the flow plate 90, to be manufactured in multiple pieces. For example, the flow plate 90 shown in the embodiment of FIGS. 4 and 5 is of single piece construction. A complicated wire EDM process is required to precisely form the extrusion orifice 92 and the compound angles leading thereto. Also, the non-adjustable extrusion orifice 92 formed by wire EDM cannot be properly polished in improve the flow of molten elastomeric material thereover. However, the moveable slide member 100 overcomes these disadvantages by allowing the extrusion orifice 92 to be formed by standard milling machines. Also, the two piece construction permits the extrusion orifice 92 to be fully polished for improved flow characteristics. As with the preceding embodiments, whenever multiple striping of the elastomeric layer 40 is required, a corresponding multiple number of extrusion orifices 62, and hence orifice adjuster means 98, will be provided.

According to yet another embodiment of the subject invention illustrated in FIG. 7, the extrusion die of the extruder 26 may be modified to form a multiple extrusion die assembly, generally indicated at 54' for simultaneously laminating a thin film of elastomeric material 40' onto two separate continuous strip metallic substrates 36'. The multiple extrusion die assembly 54' includes a housing 56' having a longitudinally extending passageway 58' disposed therethrough for guiding two moving continuous strip metallic substrates 36' in back-to-back relation. A distribution means 60' is disposed within the housing 56' for conveying elastomeric material under pressure. A first extrusion means 106' is disposed in the passageway 58' and communicates with the distribution means 60' for extruding pressurized fluidic elastomeric material onto the metallic substrate 36' within the passageway 58'. A second extrusion means 108' communicates with the distribution means 60' and is disposed in the passageway 58' directly laterally across from the first extrusion means 106' for emitting pressurized fluidic elastomeric material onto the second metallic substrate 36' within the passageway 58' such that the pressurized elastomeric materials from the first extrusion means 106' and the second extrusion means 108' are directed toward each other to neutralize the reaction forces from the respective emissions of pressurized elastomeric material. As with the preceding embodiments, the passageway 58' is shaped so as to receive both substrates 36' in a flat and parallel planar condition. By simultaneously laminating two substrates 36' productivity is doubled. Also, by orienting the respective extrusion orifices so that the resulting reaction forces from the pressurized elastomeric material are canceled, the anti-wear plate is completely eliminated. Thus, it is only by elimination of the anti-wear plate and attendant structure that space is provided within the die assembly 54' for the second extrusion means 108'.

The first extrusion means 106' includes a first extrusion orifice 110' and the second extrusion means 108' includes a second extrusion orifice 112'. As shown in FIG. 7, both the first 110' and second 112' extrusion orifices are disposed in a single rigid flow plate 90'. The flow plate 90' includes a first hollow 114' formed therein defining a first cavity communicating with the first orifice 110' and a second hollow 116' formed by machining therein defining a second cavity communicating with the second extrusional orifice 112'.

As with the preceding embodiments, a first die adjuster means 118' is provided for adjusting the position of a first die member 120' laterally of the passageway 58'. A second die adjuster means 122' is provided for adjusting the position of a second die member 124' laterally of the passageway 58'.

The method of forming multiple composite contoured strips using the multiple extrusion die assembly 54' comprises the steps of moving a flat first sheet metal substrate 36' having an upper surface 38' into the extrusion die 54' and laminating a portion of the first substrate upper surface 38' with a plastic film elastomeric layer 40' as the first substrate 36' moves through the extrusion die 54'. Simultaneously therewith, an inverted flat second sheet metal substrate 36' having a lower surface 38' is moved into the extrusion die 54' in back-to-back relation with the first substrate 36'. A portion of the second substrate lower surface 38' is laminated with a plastic film 40' as the second substrate 36' moves through the extrusion die 54' to neutralize the reaction forces from the respective emissions of pressurized elastomeric materials. Subsequently, each of the composite contoured strips 35' thus formed are roll-formed to final contoured shapes to produce finished work parts.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A composite contoured strip comprising:
   a sheet of malleable stainless steel substrate having an upper surface;
   a sheet of elastomeric material laminated to a portion of said upper surface with a generally linear boundary line along said upper surface dividing said elastomeric layer from an unlaminated portion of said upper surface, and a layer of metallic plate disposed over said unlaminated portion of said upper surface;
   and characterized by a fold in said substrate extending adjacent and parallel to said boundary line and bending said unlaminated portion to overlie and compress said elastomeric layer into compression against the laminated portion of said upper surface to seal said fold against lateral moisture penetration.

2. A strip as set forth in claim 1 further characterized by said plate comprising a chromium composition.

3. A strip as set forth in claim 1 wherein said substrate includes at least one peripheral edge, further characterized by said unlaminated portion being disposed along said peripheral edge.

4. A strip as set forth in claim 3 further characterized by said elastomeric layer comprising a polyvinylchloride material.

* * * * *

UNITED STATES PATENT AND TRADEMARK OFFICE
CERTIFICATE OF CORRECTION

PATENT NO. : 5,348,810
DATED     : September 20, 1994
INVENTOR(S) : Michael C. Page It is certified that error appears in the above-indentified patent and that said Letters Patent is hereby corrected as shown below:

Claim 1, column 10, line 53 after "the" delete "laminated" and insert --unlaminated--

Signed and Sealed this

Seventeenth Day of January, 1995

Attest:

BRUCE LEHMAN

Attesting Officer        Commissioner of Patents and Trademarks